United States Patent [19]

Randoll et al.

[11] 4,242,812
[45] Jan. 6, 1981

[54] TYPODONT HAVING REMOVABLE TEETH

[75] Inventors: Ivan H. Randoll, 60 Camino La Madera, Camarillo, Calif. 93010; Robert C. McShirley, Glendale, Calif.

[73] Assignee: Ivan H. Randoll, Camarillo, Calif.

[21] Appl. No.: 15,418

[22] Filed: Feb. 26, 1979

[51] Int. Cl.³ .............................................. G09B 23/28
[52] U.S. Cl. ...................................... 434/263; 433/74
[58] Field of Search ..................... 32/11, 71; 35/17; 433/74

[56] References Cited

U.S. PATENT DOCUMENTS

| 1,822,043 | 9/1931 | Köhler | 32/71 |
| 3,458,936 | 8/1969 | Schulz et al. | 32/71 |
| 3,702,027 | 11/1972 | Marshall et al. | 32/11 |

FOREIGN PATENT DOCUMENTS 2515445 10/1976 Fed. Rep. of Germany ............. 32/11

Primary Examiner—Gene Mancene
Assistant Examiner—John J. Wilson
Attorney, Agent, or Firm—Blakely, Sokoloff, Taylor & Zafman

[57] ABSTRACT

A typodont having one or more removable teeth which may be simultaneously locked in place by a single locking ring. The typodont includes a jaw member having one or more openings for receiving the shanks of the individual removable teeth and a parabolic arch-shaped groove cut in the jaw member which is in communication with each of the openings. The removable teeth each have a notch which is cut in the shank of the tooth with the notch being in alignment with the groove when the tooth is inserted in a jaw member opening. A locking ring having a locking portion which is shaped like the jaw member groove can be placed into the groove so that the locking portion will engage each of the notches in the shanks, thereby locking the removable teeth into place.

3 Claims, 8 Drawing Figures

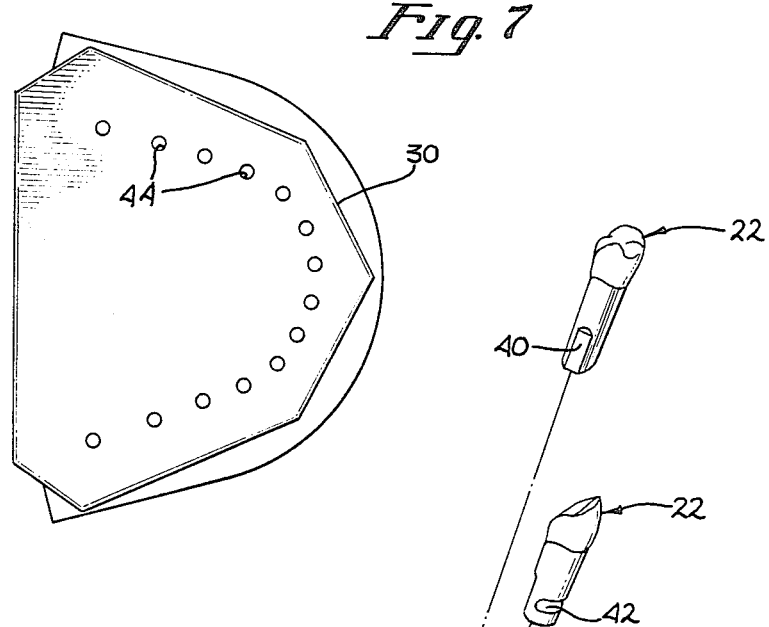
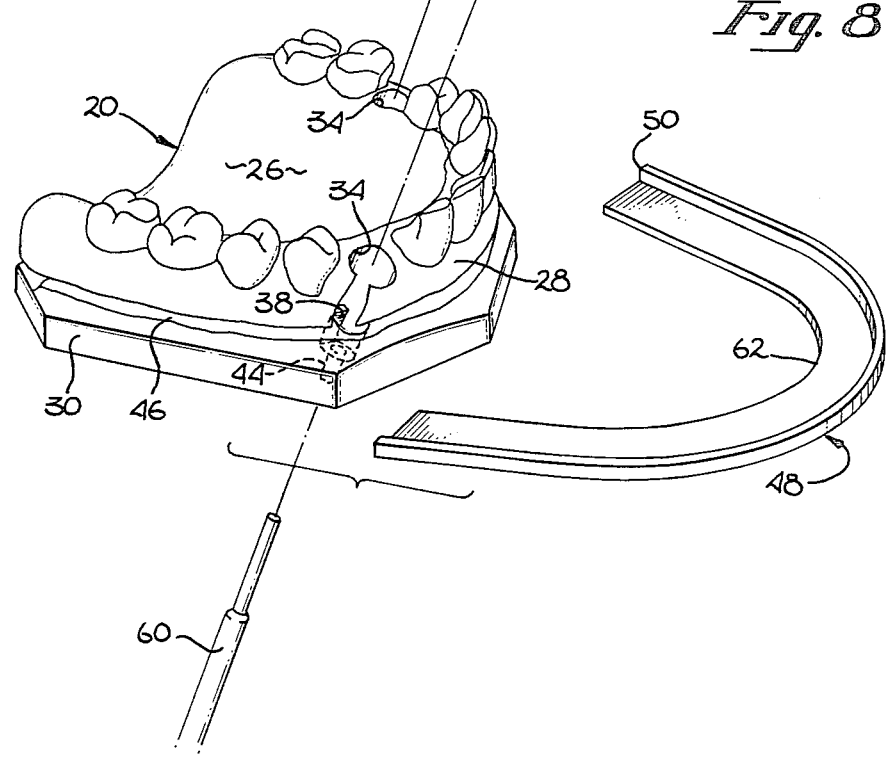

TYPODONT HAVING REMOVABLE TEETH

BACKGROUND OF THE INVENTION

1. Field of the Invention

The present invention relates to the field of typodonts and more particularly to typodonts having one or more removable teeth which can be locked into place by a single locking ring.

2. Prior Art

Typodonts now in use can be divided into two categories. The first category includes typodonts wherein the individual teeth are fixed in place and cannot be removed. These typodonts are used primarily for teaching anatomy and the like. The second category includes typodonts having one or more removable teeth. These typodonts can be used not only for teaching anatomy, but also for the purpose of teaching methods of repairing defective teeth such as methods of filling cavities caused by tooth decay and the like. In such cases a removable tooth having a simulated defect such as a cavity is inserted into the typodont. The student then makes the necessary repairs on the removable tooth and returns the typodont to the instructor for evaluation. The typodont can be reused by replacing the repaired tooth with a new tooth.

The removable teeth of the typodonts now in use are secured within the typodont in a variety of ways. Typically, each removable tooth is provided with a spherical protuberance or ball located at the bottom of the tooth. The typodont is in turn provided with a plastic sheet or the like having a plurality of spaced-apart openings, each having a diameter somewhat smaller than that of the ball on the end of each of the removable teeth. The plastic sheet is positioned within the typodont such that one of the sheet openings is located at the bottom of each of the larger openings which receive the removable teeth. When a removable tooth is to be inserted into the typodont, the tooth is placed in the appropriate opening and a downwardly directed force is applied, thereby causing the tooth to snap into place when the ball on the lower end of the tooth passes through the opening in the plastic sheet. Since the opening in the sheet is slightly smaller than the ball, the tooth will be retained in the typodont. Removal of the teeth in the prior art typodont is accomplished by grasping a tooth firmly and pulling upwardly. This causes the ball on the tooth to pass through the opening in the sheet thereby freeing the tooth from the typodont.

The prior art typodont just described permits a single removable tooth to be replaced with relative ease. However, such typodonts do possess several shortcomings. First, the removable teeth do not always remain properly aligned in the typodont when substantial forces are applied by dental tools or the like. Second, each removable tooth is retained in place by a separate retaining means. Removal and replacement of several removable teeth can be time consuming. Furthermore, in examination applications it is desirable to seal the removables in place using sealing wax or the like for the purpose of preventing unauthorized removal and substitution. The prior art typondonts require that each removable be separately sealed which is cumbersome and not always practical.

A typodont having removable teeth which remain properly aligned even when large forces are applied to the individual teeth would be highly desirable. Also, a typodont having a single locking means which permits all of the removable teeth to be locked in place and unlocked simultaneously would be advantageous in that one or more of the teeth could be effortlessly substituted. Furthermore, a single locking ring or pin could be easily sealed for examination purposes and would obviate the necessity of separately sealing each removable tooth.

SUMMARY OF THE INVENTION

A typodont having one or more removable teeth which may be simultaneously locked in place by a single locking ring is disclosed. The typodont includes a jaw member having a base and a gum section on the base which defines one or more openings for receiving the removable teeth. A parabolic arch-shaped groove which is in communication with each of the openings is cut into the periphery of the jaw member.

The removable teeth each include a crown which has a shape similar to that of an actual tooth and a lower shank portion which is inserted into one of the jaw member openings. A notch is cut into each shank, the notch being located on the shank such that when the tooth is inserted into the gum member the notch is in alignment with the jaw member groove. The gum member also has a shape similar to that of an actual gum so that the interface between the gum portion and the removable teeth simulate an interface between an actual gum and actual teeth.

A facet or indentation is formed on the lower portion of each shank for the purpose of aligning the removable teeth in the typodont. A boss or similar protuberance is formed on the side of each gum section opening so that when the tooth is inserted into the opening, the boss will engage the indentation in the shank and force the tooth into alignment.

The typodont further includes a locking pin or ring having a locking portion. The locking portion has a shape similar to the jaw member groove so that when the locking ring is placed within the groove, the locking portion will engage the notches in each of the shanks thereby locking each removable tooth in place.

BRIEF DESCRIPTION OF THE DRAWINGS

FIG. 7 is a bottom view of the typodont showing the apertures used for removing the teeth.

FIG. 8 is an exploded perspective view of the typodont showing the means by which a removable tooth is removed.

DETAILED DESCRIPTION OF THE INVENTION

Figure 1:
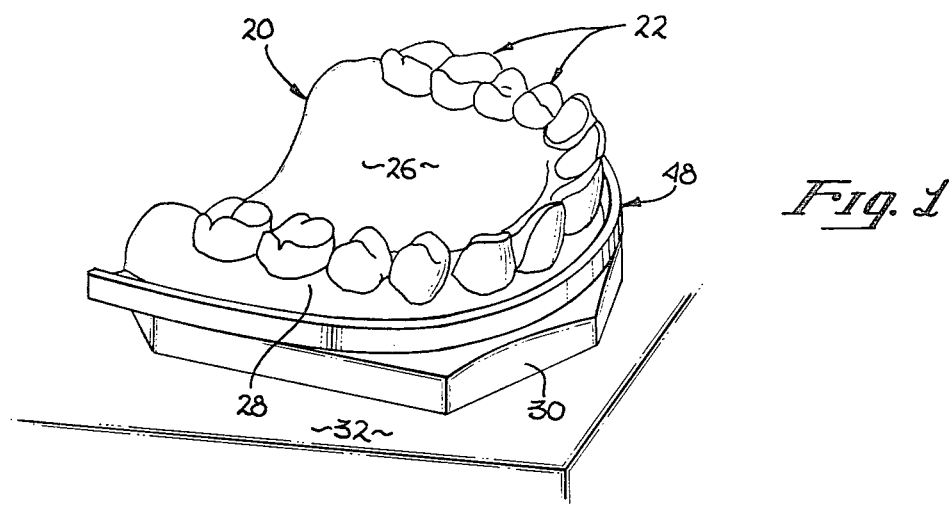
FIG. 1 is a perspective view of the typodont showing all of the removable teeth secured in position.
Figure 2:
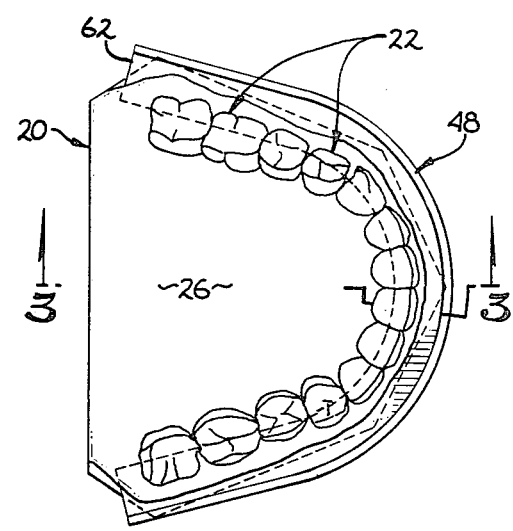
FIG. 2 is a plan view of the typodont showing all of the removable teeth secured in position.
Figure 3:
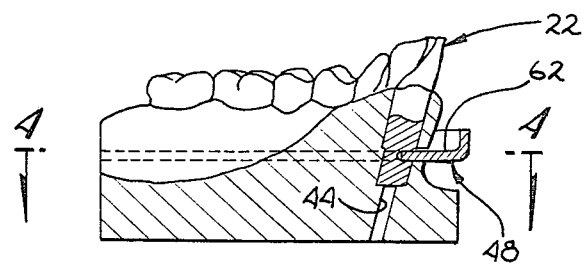
FIG. 3 is a cross-sectional side view of the typodont taken substantially through line 3—3 of FIG. 2.

Referring now to the drawings, a preferred embodiment of the invention may be seen in FIG. 1. The subject typodont is comprised of a jaw member, generally indicated by the numeral 20, a plurality of teeth 22, and a locking ring 48. Although all of the teeth 22 shown in the drawings are removable, a typodont having only one or more "removables" could also be used. Similarly, the typodont shown is a model of the upper teeth which are somewhat larger than the lower teeth. Obviously, a typodont of the lower teeth is within the scope of the invention disclosed herein.

The jaw member 20 is preferably an epoxy casting. Epoxy resins filled with alumina or the like have been found to be suitable. Jaw member 20, which is a model of the roof of a mouth, includes a palate region 26 bounded in front and at the sides by a parabolic arch-shaped gum section 28. As can best be seen in FIGS. 1 and 7, jaw section 20 further includes a base or pedestal 30 having a flat lower surface which permits the typodont to rest securely on the surface 32 of a work bench or table.

Figure 5:
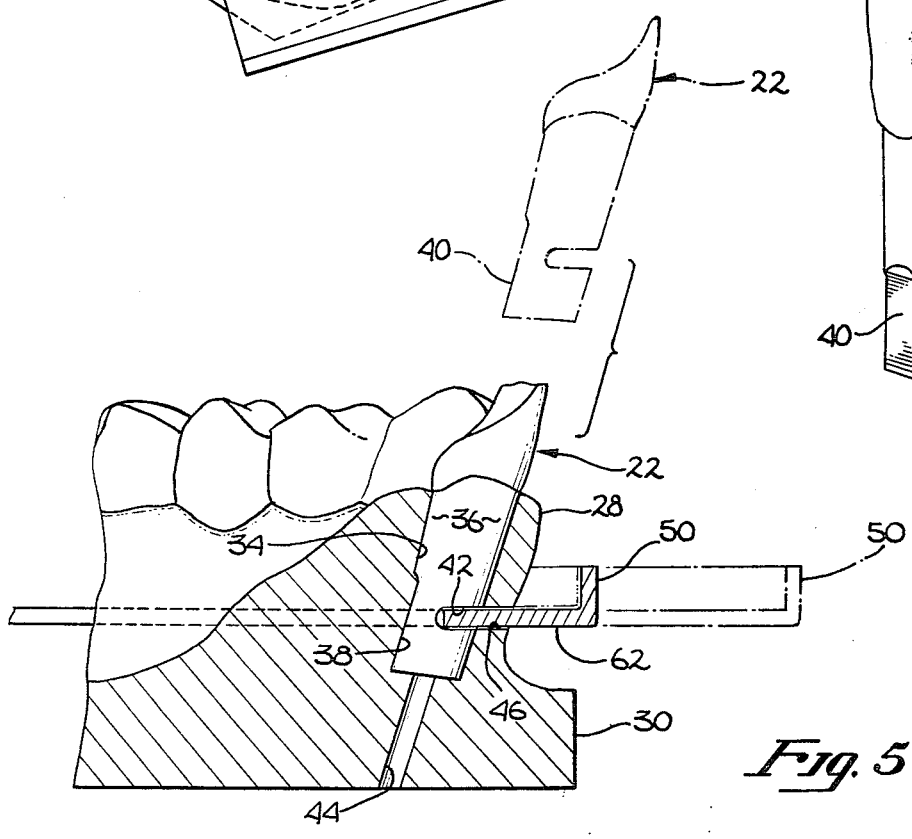
FIG. 5 is a fragmentary cross-sectional side view of the typodont showing the details of a tooth locked in position by the locking ring.

Referring now to FIGS. 5 and 8, a plurality of openings 34 are formed in gum section 28, each of which is adapted to receive a shank 36 of an individual tooth or removable 22. The openings 34, which extend through approximately two-thirds of the depth of jaw member 20, are spaced relatively closely in the forward region of the typodont where the narrow incisors are located and spaced further apart in the rear region to receive the wider molars. Each opening 34 is provided with a key 38 or flattened boss formed on the opening wall near the base of the opening. A plurality of apertures 44 having a diameter substantially smaller than that of openings 34 extend from the bottom of base 30 up through the base of each of the openings 34. Apertures 44, as will be described in greater detail below, are used when removing the individual removables.

Figure 4:
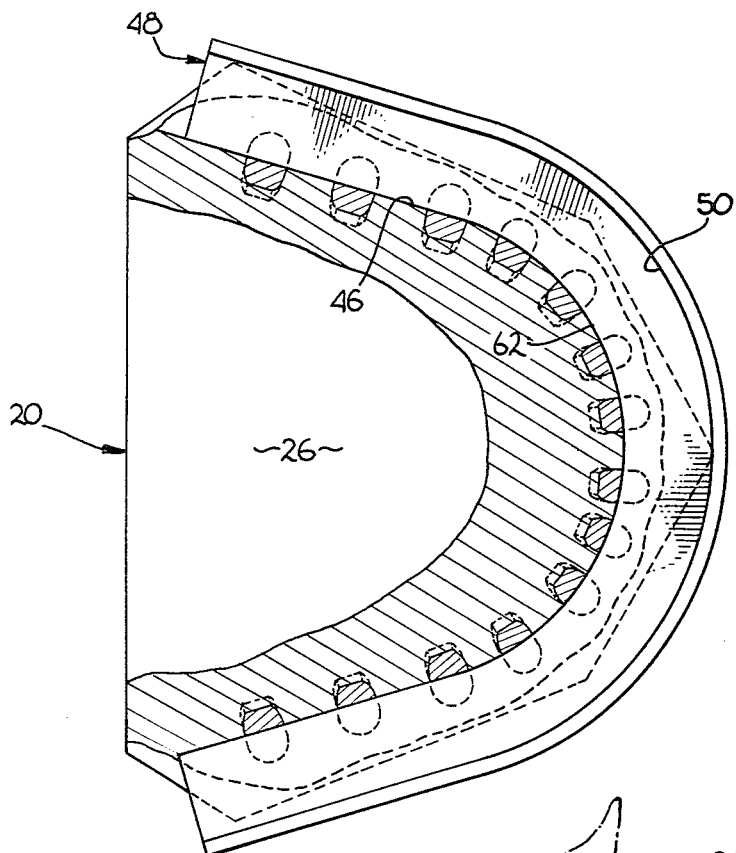
FIG. 4 is a cross-sectional plan view of the typodont taken substantially through line 4—4 of FIG. 3.

As may best be seen in FIGS. 4 and 8, a groove 46 is formed in the outer periphery of jaw member 20 immediately above base 30. Groove 46, which is in the form of a parabolic arch, extends into the gum portion 28 approximately half way through each opening 34. A locking ring 48 having a shape complementary to groove 46 and a generally L-shaped cross-section is also provided. The ring, which can be fabricated from various materials including injection molded plastics and stamped aluminum, includes a locking portion 62 and a lip 50 formed in the outer periphery of the ring. The ring 48 is adapted to be fitted into groove 46 as shown in FIGS. 3, 4, 5 and 6. When ring 48 is in place, the locking portion 62 of the ring extends approximately half way through each of the openings 34. Lip 50 permits the ring to be easily gripped for the purpose of removing the ring from the jaw member 20, as shown in FIG. 8 and as shown in phantom in FIG. 5.

Figure 6:
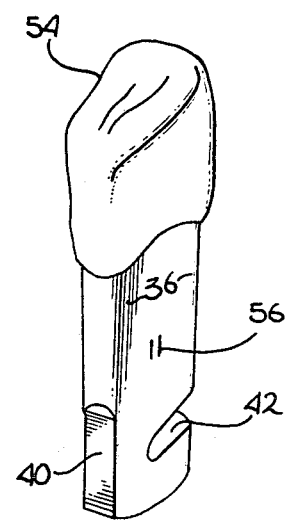
FIG. 6 is a perspective view of an individual removable tooth.

The subject invention further includes a plurality of removable teeth or so-called "removables", generally indicated by the numeral 22. The removables are preferably epoxy castings. Glass-filled epoxy resins have been found to be particularly suitable. As shown in FIG. 6, each removable 22 includes an upper portion or crown 54 which has a shape similar to that of the crown of a real tooth. The crowns 54 of the four removables located in the front portion of the typodont are similar in shape to that of actual incisors with the remainder of the removables simulating the bicuspid and molar teeth.

The lower portion of each removable 22 includes a shank 36 having indentation or facet 40 formed in the lower portion thereof. A numeral 56, which is embossed on the surface of shank 36, is used to identify each removable and indicate the particular opening 34 in which the removable should be inserted. The dimensions of shank 36 are such that when a removable is inserted in the appropriate opening 34, the shank will fit snuggly in the jaw member with the facet 40 firmly engaging the boss 38. Facet 40 and boss 38 cooperate so as to force the removable into proper alignment with respect to jaw member 20 and prevent the removable from rotating when a substantial force is applied to the crown using a dental tool or the like.

Each removable further includes a notch 42 cut in the lower portion of the shank which extends approximately half way through the shank. As can be seen in FIGS. 4 and 5, the location of notch 42 and the dimensions of the notch are such that when a removable is inserted firmly in the appropriate opening 34, the notch coincides with the groove 46 cut in jaw member 20. When one or more removables are placed within jaw member 22, the locking ring 48 may then be inserted into groove 46 with the locking portion 62 of the ring being positioned in notch 42 of each removable. The removables are, therefore, securely retained within the typodont.

The removables may be removed in a straightforward manner. The user simply grasps the locking ring by lip 50 and pulls the ring outwardly away from the jaw member 20. As shown in FIG. 8, a punch 60 or similar tool is then inserted in the aperture 44 positioned below the removable 22 to be removed. The punch is driven upwardly until it contacts the lower surface of the shank 36 and forces the removable from the typodont. All or some of the removables may be removed in this manner. Replacement removables may then be inserted in the appropriate openings 34 and then locked in place by replacing locking pin 48.

Thus, a novel typodont having one or more removables which may be secured in place by a single locking ring or pin has been disclosed. The typodont is particularly suitable for examination purposes since the locking ring 48 may be sealed in place using a small quantity of sealing wax or the like, thereby preventing unauthorized removal of one or more removables.

I claim:

1. A typodont comprising:

a jaw member including a base and a gum section on said base;

said gum section defining a plurality of spaced-apart openings which are arranged in the general shape of an arch, and said jaw member further defining an elongated groove generally extending about said arch, said groove being in communication with each of said openings;

a plurality of removable tooth members, each removable tooth member comprising a crown and a shank, and each of said shanks defining a notch which is in substantial alignment with said groove when said removable tooth members are inserted into said openings;

a generally U-shaped locking ring which cooperatively engages said groove, with said ring having a locking portion which extends into each of said openings when said locking ring is inserted into said groove;

wherein said locking ring has a gripping portion with a generally L-shaped cross-section which extends around the entire outer periphery of said locking ring so that said locking ring may be easily gripped;

whereby said removable tooth members may be inserted into said openings and locked therein by placing said locking ring into said groove thereby causing said locking portion of said locking ring to engage said notch in each of said removable tooth members.

2. The typodont of claim 1 wherein said jaw member further defines a plurality of apertures having a diameter smaller than that of said openings, said apertures extending from the bottom of said jaw member to the bottom of each of said openings.

3. The typodont of claim 2 further including an alignment means coupled to said jaw member at each of said openings and coupled to each of said shanks, said alignment means being a means for aligning said removable teeth in said openings.

* * * * *